US008284863B2

(12) United States Patent
Hwang et al.

(10) Patent No.: US 8,284,863 B2
(45) Date of Patent: Oct. 9, 2012

(54) APPARATUS AND METHOD FOR BEAMFORMING WITH LIMITED FEEDFORWARD CHANNEL IN MULTIPLE INPUT MULTIPLE OUTPUT WIRELESS COMMUNICATION SYSTEM

(75) Inventors: In-Soo Hwang, Yongin-si (KR);
Jong-Hyung Kwun, Seongnam-si (KR);
David Mazzarese, Suwon-si (KR);
Robert Heath, Jr., Austin, TX (US);
Chan-Byoung Chae, Austin, TX (US)

(73) Assignees: Samsung Electronics Co., Ltd., Suwon-si (KR); Board of Regents, The University of Texas, Austin, TX (US)

( * ) Notice: Subject to any disclaimer, the term of this patent is extended or adjusted under 35 U.S.C. 154(b) by 1166 days.

(21) Appl. No.: 12/156,001

(22) Filed: May 29, 2008

(65) Prior Publication Data
US 2009/0016460 A1    Jan. 15, 2009

(30) Foreign Application Priority Data
May 29, 2007    (KR) .......................... 10-2007-0051823

(51) Int. Cl.
*H04L 27/00*    (2006.01)
*H04B 7/06*    (2006.01)
(52) U.S. Cl. ..................................... 375/299; 455/101

(58) Field of Classification Search ............... 375/267, 375/299; 455/91, 101
See application file for complete search history.

(56) References Cited

U.S. PATENT DOCUMENTS

| 2006/0056531 A1* | 3/2006 | Li et al. ................... 375/267 |
| 2006/0092054 A1* | 5/2006 | Li et al. ................... 341/67 |
| 2007/0211823 A1* | 9/2007 | Mazzarese et al. ....... 375/299 |
| 2009/0252250 A1* | 10/2009 | Heath et al. .............. 375/267 |

FOREIGN PATENT DOCUMENTS

| EP | 1998470 A2 * | 12/2008 |
| JP | 2006-345531 | 12/2006 |
| JP | 2007517455 T | 6/2007 |
| WO | WO 2005/062729 A2 | 7/2005 |

* cited by examiner

*Primary Examiner* — Tesfaldet Bocure

(57) ABSTRACT

An apparatus and method are provided for beamforming in a MIMO wireless communication system. A base station includes a first calculator that repeatedly calculates downlink beamforming vectors of the user terminals to calculate the optimal beamforming vectors for the user terminals, a quantizer that quantizes the downlink beamforming vectors in order to transmit information of the downlink beamforming vectors, a control channel transmitter that feeds forward information of the quantized downlink beamforming vectors to the user terminals, a second calculator that calculates the final downlink beamforming vectors of the user terminals, and a beamforming transmitter that sums the beamformed TX signals of the user terminals and transmits the summed TX signals through a plurality of TX antennas.

26 Claims, 9 Drawing Sheets

APPARATUS AND METHOD FOR BEAMFORMING WITH LIMITED FEEDFORWARD CHANNEL IN MULTIPLE INPUT MULTIPLE OUTPUT WIRELESS COMMUNICATION SYSTEM

CROSS-REFERENCE TO RELATED APPLICATION(S) AND CLAIM OF PRIORITY

The present application claims priority under 35 U.S.C. §119 to an application filed in the Korean Intellectual Property Office on May 29, 2007 and assigned Serial No. 2007-51823, the contents of which are incorporated herein by reference.

TECHNICAL FIELD OF THE INVENTION

The present invention relates generally to a Multiple-Input, Multiple-Output (MIMO) wireless communication system, and in particular, to an apparatus and method for beamforming in a MIMO wireless communication system.

BACKGROUND OF THE INVENTION

Recently, a MIMO technique using multiple transmit and receive (TX/RX) antennas is attracting much attention as one of techniques to satisfy an increasing demand for high-speed and high-quality data transmission. Since the MIMO technique performs communication using the multiple channels resulting from multiple antennas, it can greatly increase the channel capacity in comparison with the case of using a single antenna. For example, if a transmit (TX) node and a receive (RX) node use an M number of TX antennas and an M number of RX antennas, the channels of the respective antennas are independent of one another, and the bandwidth and the total TX power are fixed, the average channel capacity increases M times in comparison with the case of using a single antenna.

The MIMO technique can be classified into a Single User MIMO (SU-MIMO) technique and a Multiple User MIMO (MU-MIMO) technique. The SU-MIMO technique is used to perform one-to-one communication between a pair of TX/RX nodes by allowing the pair of TX/RX nodes to occupy all of the multiple channels resulting from multiple antennas. The MU-MIMO technique is used to perform one-to-many communication between a TX node and multiple RX nodes by dividing the multiple channels resulting from multiple antennas among the multiple RX nodes. Among the MU-MIMO techniques, a technique using a MIMO broadcast channel is attracting attention as the next-generation wireless communication technology.

The MIMO broadcast channel is used to provide downlink communication from a base station having multiple TX antennas to multiple user terminals having one or more RX antennas. One of the most ideal transmission schemes for the MIMO broadcast channel is a Dirty Paper Coding (DPC) scheme capable of achieving the maximum transmission rate. However, the DPC scheme is very difficult to implement in practice. Therefore, various schemes have been proposed that are close in performance to the DPC scheme and are relatively easy to implement in practice.

A nonlinear beamforming scheme has been proposed that is near in performance to the DPC scheme. However, the nonlinear beamforming scheme is difficult to apply to practical systems because it still has very high complexity. There is therefore a need in the art for a low-complexity linear beamforming scheme to perform efficient downlink communication using the MIMO broadcast channel.

SUMMARY OF THE INVENTION

To address the above-discussed deficiencies of the prior art, it is a primary object of the present invention is to substantially solve at least the above problems and/or disadvantages and to provide at least the advantages below. Accordingly, an object of the present invention is to provide an apparatus and method for low-complexity linear beamforming in a MIMO wireless communication system.

Another object of the present invention is to provide a beamforming apparatus and method adapted to the situation of the limited capacity of a control channel for exchanging beamforming vector selection information in a MIMO wireless communication system.

Still another object of the present invention is to provide a beamforming apparatus and method using a quantized beamforming vector to exchange beamforming vector selection information in a MIMO wireless communication system.

Another object of the invention provides a beamforming apparatus and method considering an error due to a quantized beamforming vector in a MIMO wireless communication system.

According to one aspect of the present invention, an apparatus for a base station in a MIMO wireless communication system includes: a first calculator for repeatedly calculating, using information of downlink channel matrixes of spatial multiple access user terminals, downlink beamforming vectors of the user terminals to calculate the optimal beamforming vectors for the user terminals; a quantizer for quantizing the downlink beamforming vectors in order to transmit information of the downlink beamforming vectors; a control channel transmitter for feeding forward information of the quantized downlink beamforming vectors to the user terminals over a control channel; a second calculator for calculating the final downlink beamforming vectors of the user terminals in consideration of an error due to the quantization; and a beamforming transmitter for summing the beamformed TX signals of the user terminals in accordance with the final downlink beamforming vectors and transmitting the summed TX signals through a plurality of TX antennas.

According to another aspect of the present invention, an apparatus for a user terminal in a MIMO wireless communication system includes: a detector for detecting quantized downlink beamforming vector information received from a base station; a calculator for multiplying the downlink beamforming vector by a downlink channel matrix between the base station and the user terminal to calculate a downlink combining vector; and a beam combining receiver for multiplying a Hermitian matrix of the downlink combining vector by signals received through a plurality of RX antennas.

According to still another aspect of the present invention, a method for operating a base station in a MIMO wireless communication system includes: repeatedly calculating, using information of downlink channel matrixes of spatial multiple access user terminals, downlink beamforming vectors of the user terminals to calculate the optimal beamforming vectors for the user terminals; quantizing the downlink beamforming vectors in order to transmit information of the downlink beamforming vectors; feeding forward information of the quantized downlink beamforming vectors to the user terminals over a control channel; calculating the final downlink beamforming vectors of the user terminals in consideration of an error due to the quantization; and summing the beamformed TX signals of the user terminals in accordance with the final downlink beamforming vectors and transmitting the summed TX signals through a plurality of TX antennas.

According to even another aspect of the present invention, a method for operating a user terminal in a MIMO wireless communication system includes: detecting quantized downlink beamforming vector information received from a base station; multiplying the downlink beamforming vector by a downlink channel matrix between the base station and the user terminal to calculate a downlink combining vector; and multiplying a Hermitian matrix of the downlink combining vector by signals received through a plurality of RX antennas.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention is intended to provide a beamforming technique in a MIMO wireless communication system.

Figure 1:
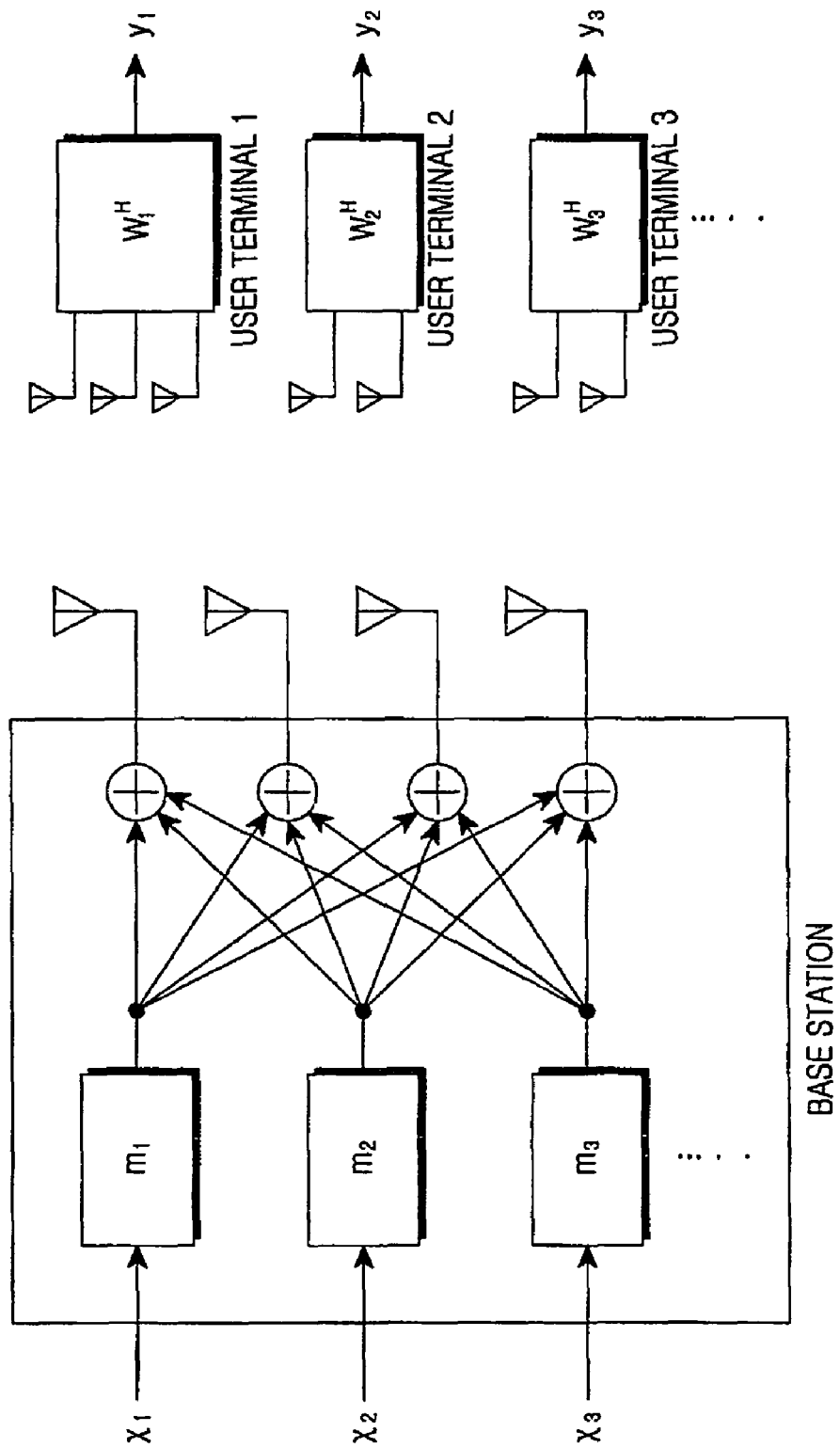
FIG. 1 is a block diagram of a MIMO wireless communication system considered in the present invention.

FIG. 1 is a block diagram of a MIMO wireless communication system considered in the present invention. The present invention considers a situation where a base station with multiple TX antennas and multiple user terminals with multiple RX antennas perform spatial multiple access communication.

Referring to FIG. 1, the base station transmits a TX signal to each user terminal through all the TX antennas, and a signal transmitted through each TX antenna is the sum of TX signals to the respective user terminals. Herein, the TX signal to each user terminal is multiplied by a beamforming vector $M_k$ and the resulting products are summed. The RX signal of each user terminal is multiplied by a Hermitian matrix $w_k^H$ of a combining vector for the user terminal itself.

Herein, the RX signal obtained by multiplication by the Hermitian matrix of the combining vector in each user terminal can be expressed as Equation 1:

$$y_k = w_k^H \left( H_k m_k x_k + H_k \sum_{l=1, l \neq k}^{K} m_l x_l + n_k \right)$$

$$= w_k^H H_k m_k x_k + w_k^H H_k \sum_{l=1, l \neq k}^{K} m_l x_l + w_k^H n_k,$$

[Eqn. 1]

where $y_k$ denotes an RX signal obtained by multiplication by a Hermitian matrix of a combining vector in the user terminal k, $w_k$ denotes a combining vector of the user terminal k, $H_k$ denotes a downlink channel matrix between the base station and the user terminal k, $m_k$ denotes a beamforming vector of the user terminal k, $x_k$ denotes a TX signal to the user terminal k, and K denotes the number of spatial multiple access user terminals.

The downlink channel matrix between the base station and the user terminal is a complex matrix with a size of {the number of RX antennas of the user terminal}×{the number of TX antennas of the base station}. Herein, an equivalent channel matrix of the user terminal k can be expressed as Equation 2:

$$\tilde{H}_k = [(w_1^H H_1)^T \ldots (w_{k-1}^H H_{k-1})^T (w_{k+1}^H H_{k+1})^T \ldots (w_K^H H_K)^T]^T,$$

[Eqn. 2]

where $\tilde{H}_k$ denotes an equivalent channel matrix of the user terminal k, $w_k$ denotes a combining vector of the user terminal k, $H_k$ denotes a downlink channel matrix between the base station and the user terminal k, and K denotes the number of spatial multiple access user terminals.

When the equivalent channel matrix is expressed as Equation 2, the beamforming vector has the characteristics expressed as Equation 3, so that the influence of interferences due to RX signals of other user terminals disappear when the RX signal of the user terminal is multiplied by the corresponding combining vector:

$$\tilde{H}_k m_k = 0.$$

[Eqn. 3]

In Equation 3, $\tilde{H}_k$ denotes a downlink channel matrix between the base station and the user terminal k, and $m_k$ denotes a beamforming vector of the user terminal k.

Also, the Singular Value Decomposition (SVD) of the channel matrix can be expressed as Equation 4:

$$\tilde{H}_k = \tilde{U}_k \tilde{D}_k [\tilde{V}_k^{(1)} \tilde{v}_k^{(0)}]^H,$$

[Eqn. 4]

where $\tilde{H}_k$ denotes an equivalent channel matrix of the user terminal k, $\tilde{U}_k$ denotes a left singular matrix, $\tilde{D}_k$ denotes a singular value of the equivalent channel matrix, $\tilde{V}_k^{(1)}$ denotes a right singular matrix corresponding to non-zero singular values, and $\tilde{v}_k^{(0)}$ denotes a right singular vector corresponding to a zero singular value.

Herein, the beamforming vector of the user terminal k is present in a space spanned by the right singular vector $\tilde{v}_k^{(0)}$. Consequently, the beamforming vector is equal to the right singular vector. If the user terminal performs maximum ratio combining (MRC) reception, the combining vector of the user terminal can be expressed as Equation 5:

$$w_k = H_k m_k,  \quad [\text{Eqn. 5}]$$

where $w_k$ denotes a combining vector of the user terminal k, $H_k$ denotes a downlink channel matrix between the base station and the user terminal k, and $m_k$ denotes a beamforming vector of the user terminal k.

When the user terminal uses the combining vector expressed as Equation 5, the user terminal estimates a channel with the base station and must determine its own beamforming vector. Herein, the determination of the beamforming vector is affected by all the beamforming vectors of the remaining user terminals. That is, in order to calculate its optimal combining vector, each user terminal must know all the channel state information of other user terminals, which causes a problem in calculating the optimal combining vector. Therefore, the present invention is intended to solve the problem of having to know all the channel state information of other user terminals in order to calculate the optimal combining vector.

In a MIMO wireless communication according to the present invention, each user terminal estimates a downlink channel and feeds back the estimated channel state information (i.e., the channel matrix information) to a base station. Thereafter, using the channel matrixes of the respective user terminal, the base station calculates the optimal beamforming vectors for the respective user terminals. Herein, the optimal beamforming vectors for the respective user terminals must be fed forward to the respective user terminals. However, there is a limit to the amount of the feedforward information (i.e., the capacity of a control channel for the feedforward). In other words, the total amount of information fed forward to the respective user terminals cannot exceed a predetermined amount. Thus, the base station feeds forward a quantized beamforming vector in order not to exceed the limited information amount.

Herein, the quantization is performed using or not using a codebook. If a codebook is used, the base station selects a beamforming vector that is closest to the beamforming vector of each user terminal in the codebook. Herein, the codebook is a set of known beamforming vectors promised between the base station and the user terminal, and the beamforming vectors in the codebook are discriminated using indexes. On the other hand, if a codebook is not used, the base station converts analog values of elements of the beamforming vector into digital values by quantizing the analog values according to the limited capacity of a control channel.

Thereafter, the base station feeds forward information of the quantized beamforming vectors, and each user terminal determines an MRC-based combining vector according to Equation (5) by using the beamforming vector corresponding to the feedforward index.

Herein, since the information of the quantized beamforming vectors are fed forward, the combining vectors calculated by the user terminals become different from the combining vectors of the user terminals that are considered in calculating the beamforming vector by the base station. Thus, the base station again calculates a beamforming vector in consideration of a change in the combining vector due to the quantization of the beamforming vector.

In order to feed forward the beamforming vector information, the base station allocates the respective user terminal the resources in the control channel. Herein, the base station allocates a relatively large number of bits to the user terminal with poor channel quality. As the number of bits available for the quantization increases, the user terminal can obtain the beamforming vector information with a smaller quantization error. Thus, the base station provides the relatively accurate beamforming vector information to the user terminal with poor channel quality, thereby allowing the user terminal to achieve a high beamforming gain. Therefore, the user terminal with good channel quality obtains a relatively inaccurate beamforming vector. However, because of the good channel quality, the user terminal can achieve a high performance with a low beamforming gain.

The RX signal of the user terminal using the quantized beamforming vector can be expressed as Equation 6:

$$y_k = \quad [\text{Eqn. 6}]$$
$$Q(m_k)^H H_k^H H_k m_k x_k + Q(m_k)^H H_k^H H_k \sum_{l=1, l \neq k}^{K} m_l x_l + Q(m_k)^H H_k^H n_k$$

where $y_k$ denotes an RX signal obtained by multiplication by a combining vector of the user terminal k, $Q(m_k)$ denotes a quantized beamforming vector of the user terminal k, $H_k$ denotes a downlink channel matrix between the base station and the user terminal k, $m_k$ denotes a beamforming vector of the user terminal k, $x_k$ denotes a TX signal to the user terminal k, K denotes the number of spatial multiple access user terminals, and $n_k$ denotes an RX noise of the user terminal k.

The Signal-to-Interference and Noise Ratio (SINR) of the user terminal using the quantized beamforming vector can be expressed as Equation 7:

$$SINR_k = \frac{|Q(m_k)^H H_k^H H_k m_k|^2}{Q(m_k)^H \left( \sum_{l=1, l \neq k}^{K} H_k^H H_k m_l m_l^H H_k^H H_k \right) Q(m_k) + Q(m_k)^H H_k^H H_k Q(m_k) \sigma^2}, \quad [\text{Eqn. 7}]$$

where $SINR_k$ denotes an SINR of the user terminal k, $Q(m_k)$ denotes a quantized beamforming vector of the user terminal k, $H_k$ denotes a downlink channel matrix between the base station and the user terminal k, $m_k$ denotes a beamforming vector of the user terminal k, K denotes the number of spatial multiple access user terminals, and $\sigma^2$ denotes a noise variance.

The beamforming vector maximizing the $SINR_k$ in Equation (7) can be expressed as Equation 8:

$$\hat{m}_k = \arg\max_{c_i \in C} SINR_k \qquad [\text{Eqn. 8}]$$

$$= \arg\max_{c_i \in C} \frac{|c_i^H H_k^H H_k m_k|^2}{c_i^H \left(\sum_{l=1, l\neq k}^{K} H_k^H H_k m_l m_l^H H_k^H H_k\right) Q(m_k) + c_i^H H_k^H H_k c_i \sigma^2}$$

where $\hat{m}_k$ denotes a beamforming vector of the user terminal k that is quantized to maximize the $SINR_k$, C denotes a codebook, $c_i$ denotes the $i^{th}$ beamforming vector contained in the codebook, $SINR_k$ denotes an SINR of the user terminal k, $H_k$ denotes a downlink channel matrix between the base station and the user terminal k, $m_k$ denotes a beamforming vector of the user terminal k, K denotes the number of spatial multiple access user terminals, and $\sigma^2$ denotes a noise variance.

Herein, since the combining vector is calculated using the quantized beamforming vector, the interference between the user terminals still remains even when the RX signal is multiplied by a Hermitian vector of the combining vector. In order to remove the remaining interference, the base station substitutes the combining vector of Equation (2) by the combining vector calculated using the quantized beamforming vector, and then substitutes the resulting value of Equation (2) in Equation (3) to update the beamforming vector. Consequently, the base station obtains the final beamforming vector considering the quantization error. When the beamforming vector considering the quantization error is used, the SINR can be expressed as Equation 9:

$$SINR_k = \frac{|\hat{m}_k^H H_k^H H_k \bar{m}_k|^2}{\sigma^2}, \qquad [\text{Eqn. 9}]$$

where $SINR_k$ denotes an SINR of the user terminal k, $\hat{m}_k$ denotes a beamforming vector of the user terminal k that is quantized to maximize the $SINR_k$, $H_k$ denotes a downlink channel matrix between the base station and the user terminal k, $\bar{m}_k$ denotes the final beamforming vector of the user terminal k, and $\sigma^2$ denotes a noise variance.

Although the above calculations of the beamforming vectors and the combining vectors have been described in the context of downlink communication, they can also be applied to uplink communication.

If the base station and the user terminals use a time division duplex (TDD) scheme, the beamforming vector used by the base station for downlink communication is used as the combining vector of the base station for uplink communication and the combining vector used by each user terminal for downlink communication is used as the beamforming vector of the user terminal for uplink communication. That is, without an additional calculation for uplink communication, the base station and the user terminals use the vector, which was calculated for downlink communication, for the uplink communication.

On the other hand, if the base station and the user terminals use a frequency division duplex (FDD) scheme, the base station calculates the combining vectors for uplink communication in the same manner as for calculating the beamforming vectors for downlink communication using uplink channel matrix information. Also, the base station feeds forward the information of the combining vectors for uplink communication to the user terminals, so that each user terminal calculates its beamforming vector for uplink communication in the same manner as for calculating the combining vector for downlink communication.

Hereinafter, the operations and structures of a base station and a user terminal, which perform TX beamforming and RX combining according to the above-described method, will be described in detail with reference to the accompanying drawings.

Figure 2:
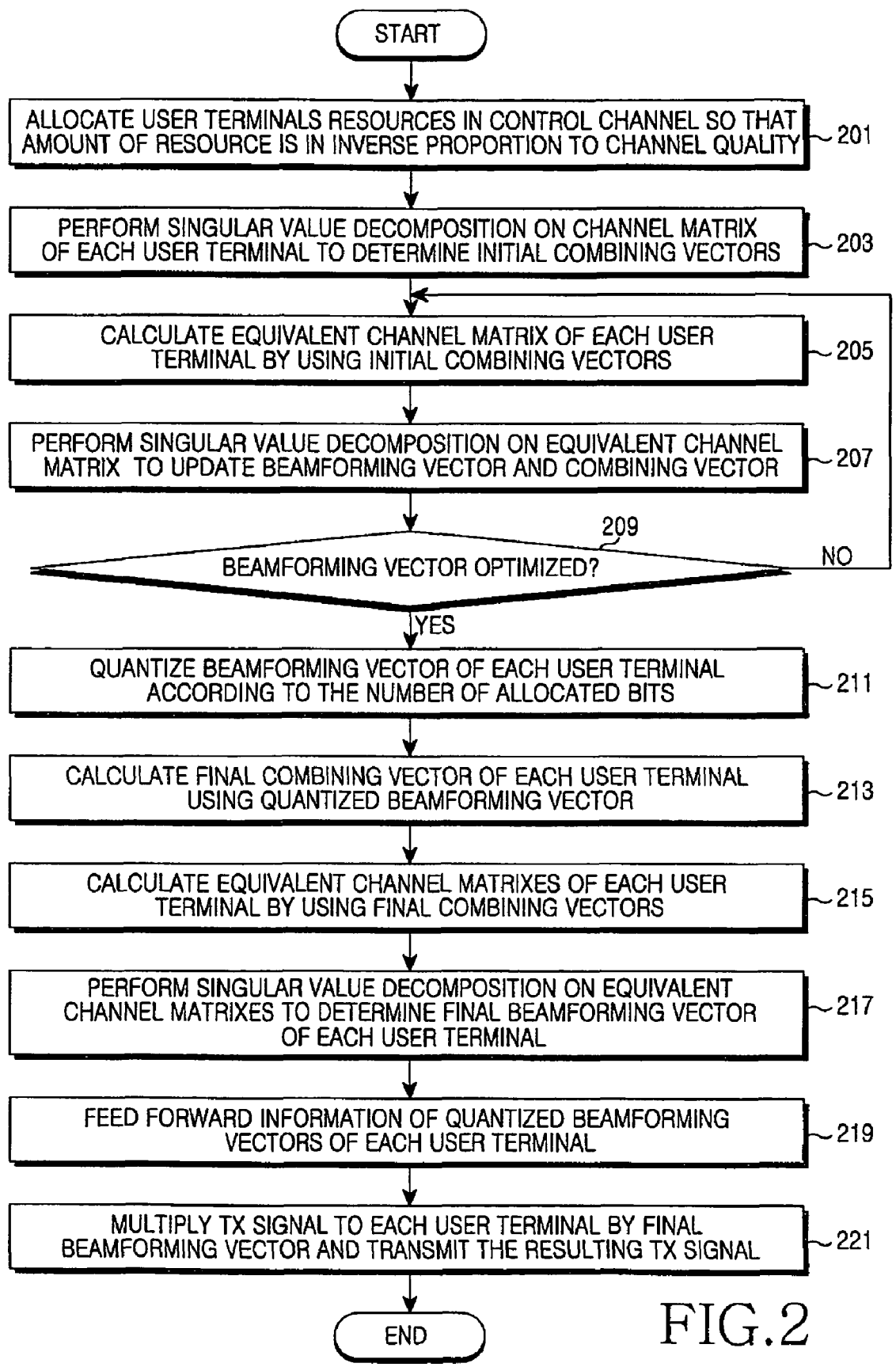
FIG. 2 is a flowchart illustrating a signal transmission process of a base station in a MIMO wireless communication system according to an embodiment of the present invention.

FIG. 2 is a flowchart illustrating a signal transmission process of a base station in a MIMO wireless communication system according to an embodiment of the present invention.

Referring to FIG. 2, in step 201, the base station allocates user terminals resources in a limited-capacity control channel for feeding forward information of beamforming vectors. Herein, the resources in the control channel are allocated to the user terminals in such a way that a relatively small amount of resource is allocated to the user terminal with good channel quality. In other words, the base station allocates resources in control channel so that amount of resource is in inverse proportion to channel quality. For example, when the user terminal 1 has poorer channel quality than the user terminal 2, the user terminal 1 is allocated a larger amount of resource than the user terminal 2. That is, in case of using codebooks, the base station decides to use larger sized codebook for user terminal having poorer channel quality.

In step 203, the base station performs singular value decomposition on a downlink channel matrix of each of spatial multiple access user terminals to determine initial combining vectors. Herein, the downlink channel matrix is fed back from each user terminal. The singular value decomposition means an operation expressed as Equation 10, and the initial combining vector is the principal left singular vector. Herein, the principal left singular vector means a column of a left singular matrix corresponding to the largest singular value:

$$H_k = U_k D_k V_k^H. \qquad [\text{Eqn. 10}]$$

In Equation 10, $H_k$ denotes a downlink channel matrix between the base station and the user terminal k, $U_k$ denotes a left singular matrix, $D_k$ denotes a singular value matrix of a channel matrix, and $V_k$ denotes a right singular matrix.

In step 205, the base station calculates an equivalent channel matrix of each user terminal by using the initial combining vectors. Herein, as expressed in Equation (2), the equivalent channel matrix is calculated by multiplying all the transpose matrixes of the products of the Hermitian vectors of the combining vectors of the remaining user terminals other than the user terminal and the respective channel matrixes and then calculating a transpose matrix of the multiplication result.

In step 207, the base station performs singular value decomposition on the equivalent channel matrix of each user terminal to update the combining vector and the beamforming vector of each user terminal. Herein, the singular value decomposition is performed as expressed in Equation 4, and the beamforming vector is a right singular vector $\tilde{v}_k^{(0)}$ corresponding to a singular value '0'. Also, the combining vector is calculated by multiplying the channel matrix and the beamforming vector expressed in Equation 5.

In step 209, the base station determines whether the beamforming vector has been optimized. For example, whether the beamforming vector has been optimized is determined using Equation 11:

$$\|m_k(i) - m_k(i-1)\| < \epsilon, \qquad [\text{Eqn. 11}]$$

where $m_k(i)$ denotes the $i^{th}$ updated beamforming vector, and $\epsilon$ denotes an optimization threshold value.

That is, if the absolute value of a difference between the last updated beamforming vector and the immediately-previous updated beamforming vector is smaller than a predetermined threshold value, the base station determines that the beamforming vector has been optimized. If the beamforming vector has not been optimized, the base station repeats steps 205 and 207. If the beamforming vectors of only some of the user terminals have not been optimized, the base station repeats steps 205 and 207 for only some of the user terminals.

On the other hand, if the beamforming vectors of all the user terminals have been optimized, the base station quantizes the optimized beamforming vector of each user terminal in accordance with the amount of allocated control channel resource (i.e., the number of allocated bits), in step 211. For example, the base station detects a codebook corresponding to the number of bits allocated to each user terminal, and selects a beamforming vector satisfying Equation 8 in the detected codebook. Alternatively, the base station converts the analog values of elements of the beamforming vector into digital values according to the number of bits allocated to each user terminal.

In step 213, the base station calculates a combining vector of each user terminal by using the quantized beamforming vector. Herein, the combining vector is calculated as expressed in Equation 5.

In step 215, the base station calculates an equivalent channel matrix of each user terminal by using the combining vector. Herein, the combining vector is calculated as expressed in Equation 2.

In step 217, the base station performs singular value decomposition on the equivalent channel matrix to determine the final beamforming vectors of each user terminal. Herein, the singular value decomposition is performed as expressed in Equation (4), and the beamforming vector is a right singular vector $\tilde{v}_k^{(0)}$ corresponding to a singular value '0'.

In step 219, the base station feeds forward information of the quantized beamforming vector of each user terminal. That is, the base station feeds forward information of the beamforming vector quantized in step 211 in order to calculate the combining vector of the user terminal.

In step 221, the base station multiplies a TX signal to each user terminal by the corresponding final beamforming vector, sums the beamformed TX signals of the respective user terminals, and transmits the summed TX signals through a plurality of antennas.

Figure 3:
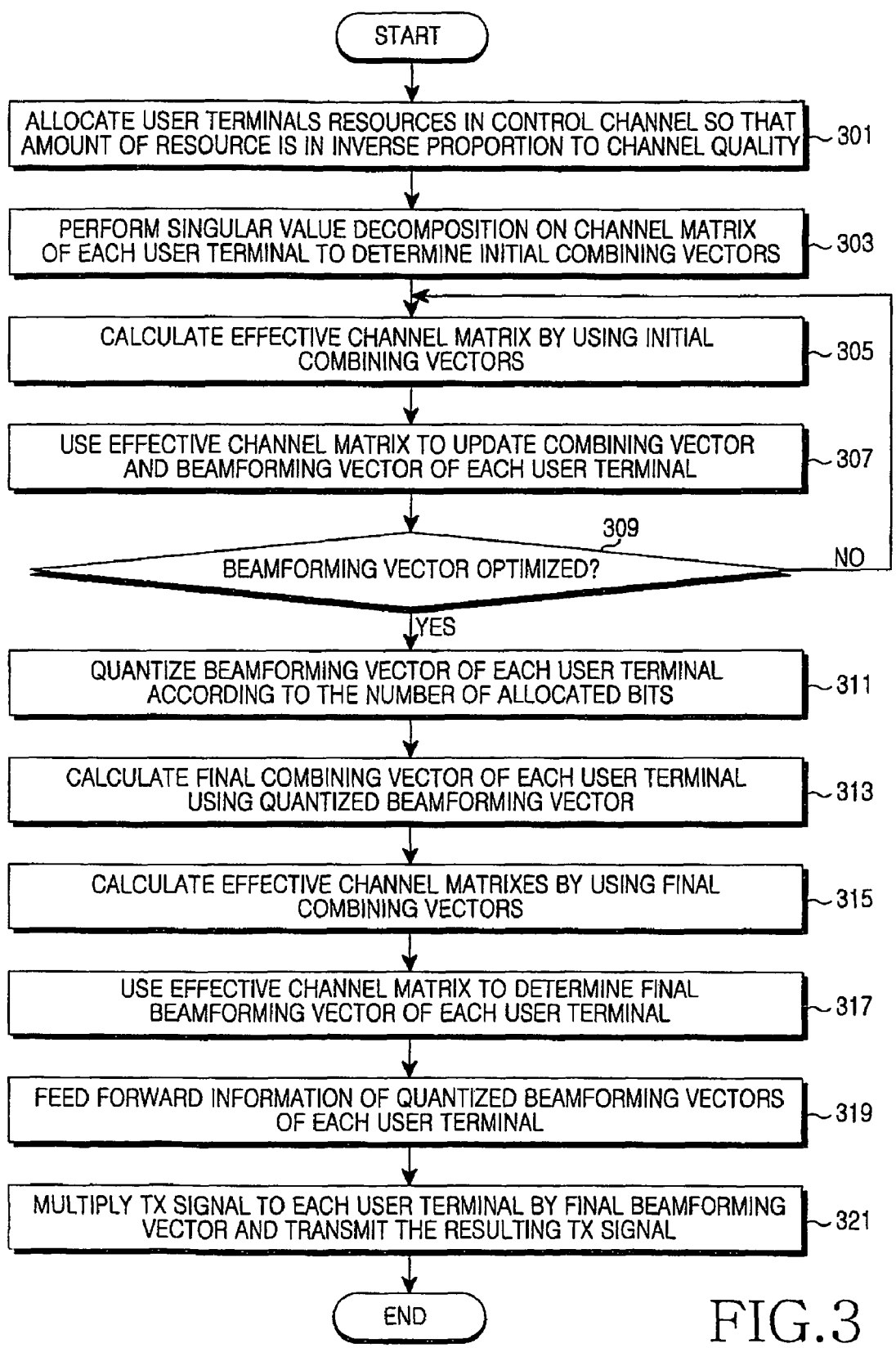
FIG. 3 is a flowchart illustrating a signal transmission process of a base station in a MIMO wireless communication system according to another embodiment of the present invention.

FIG. 3 is a flowchart illustrating a signal transmission process of a base station in a MIMO wireless communication system according to another embodiment of the present invention. FIG. 3 illustrates another embodiment for reducing the complexity due to the singular value decomposition contained in the signal transmission process of FIG. 2.

Referring to FIG. 3, in step 301, the base station allocates user terminals resources in a limited-capacity control channel for feeding forward information of beamforming vectors. Herein, the resources in the control channel are allocated to the user terminals in such a way that a relatively small amount of resource is allocated to the user terminal with good channel quality. In other words, the base station allocates resources in control channel so that amount of resource is in inverse proportion to channel quality. For example, when the user terminal 1 has poorer channel quality than the user terminal 2, the user terminal 1 is allocated a larger amount of resource than the user terminal 2. That is, in case of using codebooks, the base station decides to use larger sized codebook for user terminal having poorer channel quality.

In step 303, the base station performs singular value decomposition on a downlink channel matrix of each of spatial multiple access user terminals to determine initial combining vectors. Herein, the downlink channel matrix is information fed back from each user terminal. The singular value decomposition means an operation expressed as Equation (10), and the initial combining vector is the principal left singular vector.

In step 305, the base station calculates an effective channel matrix by using the initial combining vectors. Herein, the effective channel matrix is calculated as Equation 12:

$$H_{eff} = [(w_1^H(i-1)H_1)^T \ldots (w_k^H(i-1)H_k)^T \ldots (w_K^H(i-1)H_K)^T]^T \quad \text{[Eqn. 12]}$$

where $H_{eff}$ denotes an effective channel matrix, $w_k(i)$ denotes the $i^{th}$ updated combining vector of the user terminal k, and $H_k$ denotes a channel matrix between the base station and the user terminal k.

In step 307, the base station uses the effective channel matrix to update the combining vector and the beamforming vector of each user terminal. Herein, the beamforming vector is updated as expressed in Equation 13, and the combining vector is updated as expressed in Equation 5:

$$m_k(i) = \frac{[H_{eff}^\dagger]_k}{\|[H_{eff}^\dagger]_k\|} \quad \text{[Eqn. 13]}$$

$$H_{eff}^\dagger = H_{eff}^H (H_{eff} H_{eff}^H)^{-1},$$

where $m_k(i)$ denotes the $i^{th}$ updated beamforming vector of the user terminal k, $H_{eff}$ denotes an effective channel matrix, $H^\dagger_{eff}$ denotes a pseudo inverse matrix of the effective channel matrix, and $[H^\dagger_{eff}]_k$ denotes the $k^{th}$ column of the pseudo inverse matrix of the effective channel matrix.

In step 309, the base station determines whether the beamforming vector has been optimized. For example, whether the beamforming vector has been optimized is determined using Equation 11. That is, if the absolute value of a difference between the last updated beamforming vector and the immediately-previous updated beamforming vector is smaller than a predetermined threshold value, the base station determines that the beamforming vector has been optimized. If the beamforming vector has not been optimized, the base station repeats steps 305 and 307. If the beamforming vectors of only some of the user terminals have not been optimized, the base station repeats steps 305 and 307 for only some of the user terminals.

On the other hand, if the beamforming vectors of all the user terminals have been optimized, the base station quantizes the beamforming vector of each user terminal in accordance with the amount of allocated control channel resource (i.e., the number of allocated bits), in step 311. For example, the base station detects a codebook corresponding to the number of bits allocated to each user terminal, and selects a beamforming vector satisfying Equation (8) in the detected codebook. Alternatively, the base station converts the analog values of elements of the beamforming vector into digital values according to the number of bits allocated to each user terminal.

In step 313, the base station calculates a combining vector of each user terminal by using the quantized beamforming vector. Herein, the combining vector is calculated as expressed in Equation 5.

In step 315, the base station calculates an effective channel matrix by using the combining vector. Herein, the effective channel matrix is calculated as expressed in Equation 12.

In step 317, the base station uses the effective channel matrix to determine the final beamforming vectors of each user terminal. Herein, the final beamforming vector is determined as expressed in Equation 13.

In step 319, the base station feeds forward information of the quantized beamforming vector of each user terminal. That is, the base station feeds forward an index of the beamforming vector quantized in step 311 in order to calculate the combining vector of the user terminal.

In step 321, the base station multiplies a TX signal to each user terminal by the corresponding final beamforming vector, sums the beamformed TX signals of the respective user terminals, and transmits the summed TX signals through a plurality of antennas.

Figure 4:
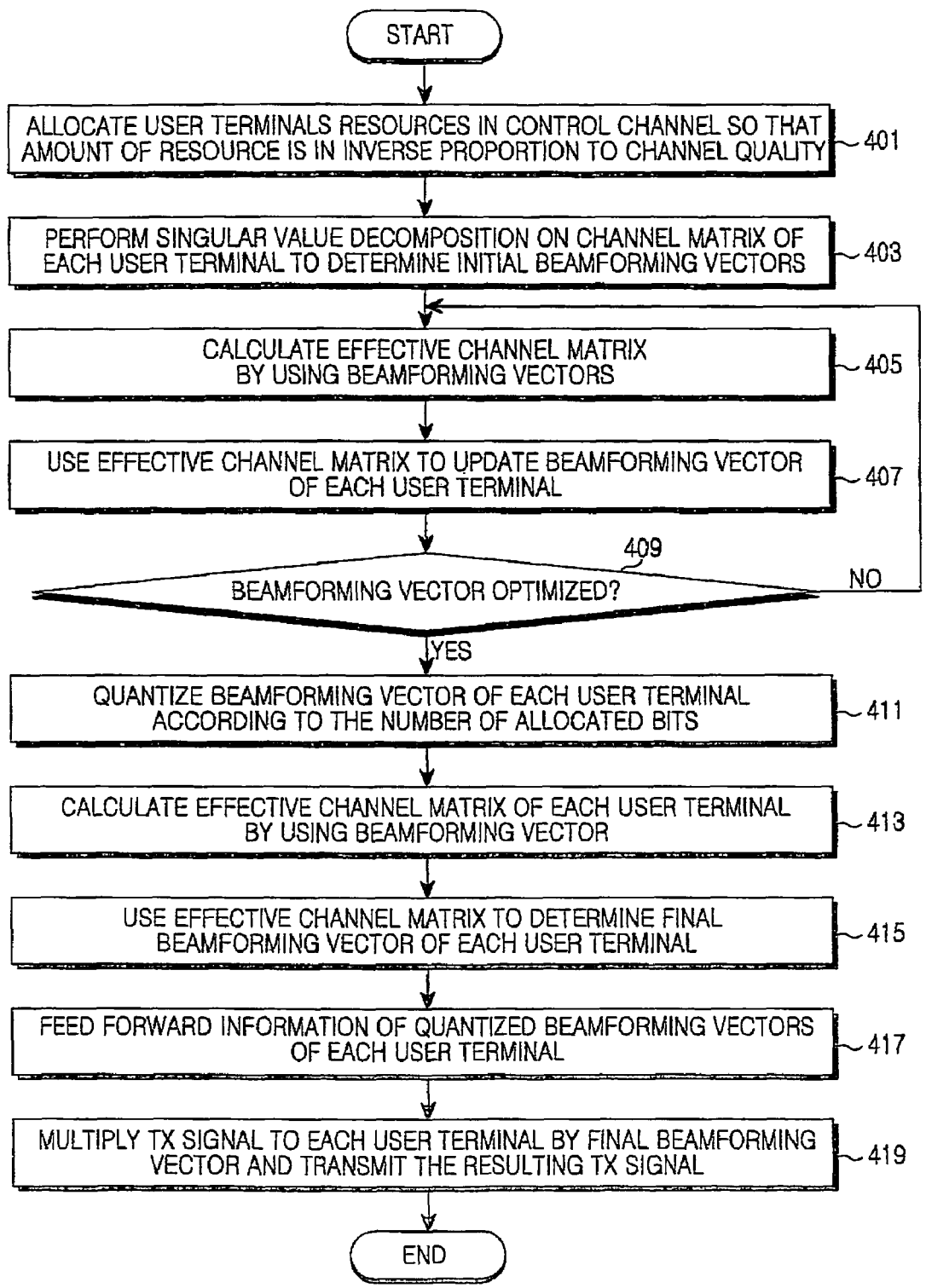
FIG. 4 is a flowchart illustrating a signal transmission process of a base station in a MIMO wireless communication system according to still another embodiment of the present invention.

FIG. 4 is a flowchart illustrating a signal transmission process of a base station in a MIMO wireless communication system according to still another embodiment of the present invention. FIG. 4 illustrates still another embodiment for performing the signal transmission process of FIG. 3 without calculating the combining vectors.

Referring to FIG. 4, in step 401, the base station allocates user terminals resources in a limited-capacity control channel for feeding forward information of beamforming vectors. Herein, the resources in the control channel are allocated to the user terminals in such a way that a relatively small amount of resource is allocated to the user terminal with good channel quality. In other words, the base station allocates resources in control channel so that amount of resource is in inverse proportion to channel quality. For example, when the user terminal 1 has poorer channel quality than the user terminal 2, the user terminal 1 is allocated a larger amount of resource than the user terminal 2. That is, in case of using codebooks, the base station decides to use larger sized codebook for user terminal having poorer channel quality.

In step 403, the base station performs singular value decomposition on a downlink channel matrix of each of spatial multiple access user terminals to determine initial beamforming vectors. Herein, the downlink channel matrix is information fed back from each user terminal. The singular value decomposition means an operation expressed as Equation (10), and the initial beamforming vector is the principal right singular vector. Herein, the principal right singular vector means a column of a right singular vector corresponding to the largest singular value.

In step 405, the base station calculates an effective channel matrix by using the initial beamforming vectors. Herein, the effective channel matrix is calculated as Equation 14:

$$H_{eff} = [(m_1^H(i-1)\hat{H}_1)^T \ldots (m_k^H(i-1)\hat{H}_k)^T \ldots (m_K^H(i-1)\hat{H}_K)^T]^T, \hat{H}_k = H_k^H H_k \quad \text{[Eqn. 14]}$$

where $H_{eff}$ denotes an effective channel matrix, $m_k(i)$ denotes the $i^{th}$ updated beamforming vector of the user terminal k, and $H_k$ denotes a channel matrix between the base station and the user terminal k.

In step 407, the base station uses the effective channel matrix to update the beamforming vector of each user terminal. Herein, the beamforming vector is updated as expressed in Equation 13.

In step 409, the base station determines whether the beamforming vector has been optimized. For example, whether the beamforming vector has been optimized is determined using Equation 11. That is, if the absolute value of a difference between the last updated beamforming vector and the immediately-previous updated beamforming vector is smaller than a predetermined threshold value, the base station determines that the beamforming vector has been optimized. If the beamforming vector has not been optimized, the base station repeats steps 405 and 407. If the beamforming vectors of only some of the user terminals have not been optimized, the base station repeats steps 405 and 407 for only some of the user terminals.

On the other hand, if the beamforming vectors of all the user terminals have been optimized, the base station quantizes the beamforming vector of each user terminal in accordance with the amount of allocated control channel resource (i.e., the number of allocated bits), in step 411. For example, the base station detects a codebook corresponding to the number of bits allocated to each user terminal, and selects a beamforming vector satisfying Equation 8 in the detected codebook. Alternatively, the base station converts the analog values of elements of the beamforming vector into digital values according to the number of bits allocated to each user terminal.

In step 413, the base station calculates an effective channel matrix of each user terminal by using the quantized beamforming vector. Herein, the effective channel matrix is calculated as expressed in Equation 14.

In step 415, the base station uses the effective channel matrix to determine the final beamforming vectors of each user terminal. Herein, the final beamforming vector is determined as expressed in Equation 13.

In step 417, the base station feeds forward information of the quantized beamforming vector of each user terminal. That is, the base station feeds forward information of the beamforming vector quantized in step 411 in order to calculate the combining vector of the user terminal.

In step 419, the base station multiplies a TX signal to each user terminal by the corresponding final beamforming vector, sums the beamformed TX signals of the respective user terminals, and transmits the summed TX signals through a plurality of antennas.

In the embodiments described with reference to FIGS. 2 through 4, the base station calculates the beamforming vectors for downlink communication. However, the above-described embodiments can also be applied to calculate the combining vector of the base station for uplink communication. If the base station uses a TDD scheme, because an uplink channel and a downlink channel are identical, the base station uses the beamforming vectors calculated according to the above-described embodiments as the combining vectors for uplink communication. On the other hand, if the base station uses an FDD scheme, it can calculate the combining vectors for uplink communication by substituting a downlink channel matrix by an uplink channel matrix. However, if the base station uses an FDD scheme, it feeds forward information of the combining vectors for uplink communication in order to calculate the beamforming vectors for uplink communication of the user terminals.

As described above, the base station calculates the combining vectors for uplink communication, and multiplies the calculated combining vectors respectively by signals received from the user terminal through a plurality of RX antennas, thereby dividing the signals of the respective user terminals.

Figure 5:
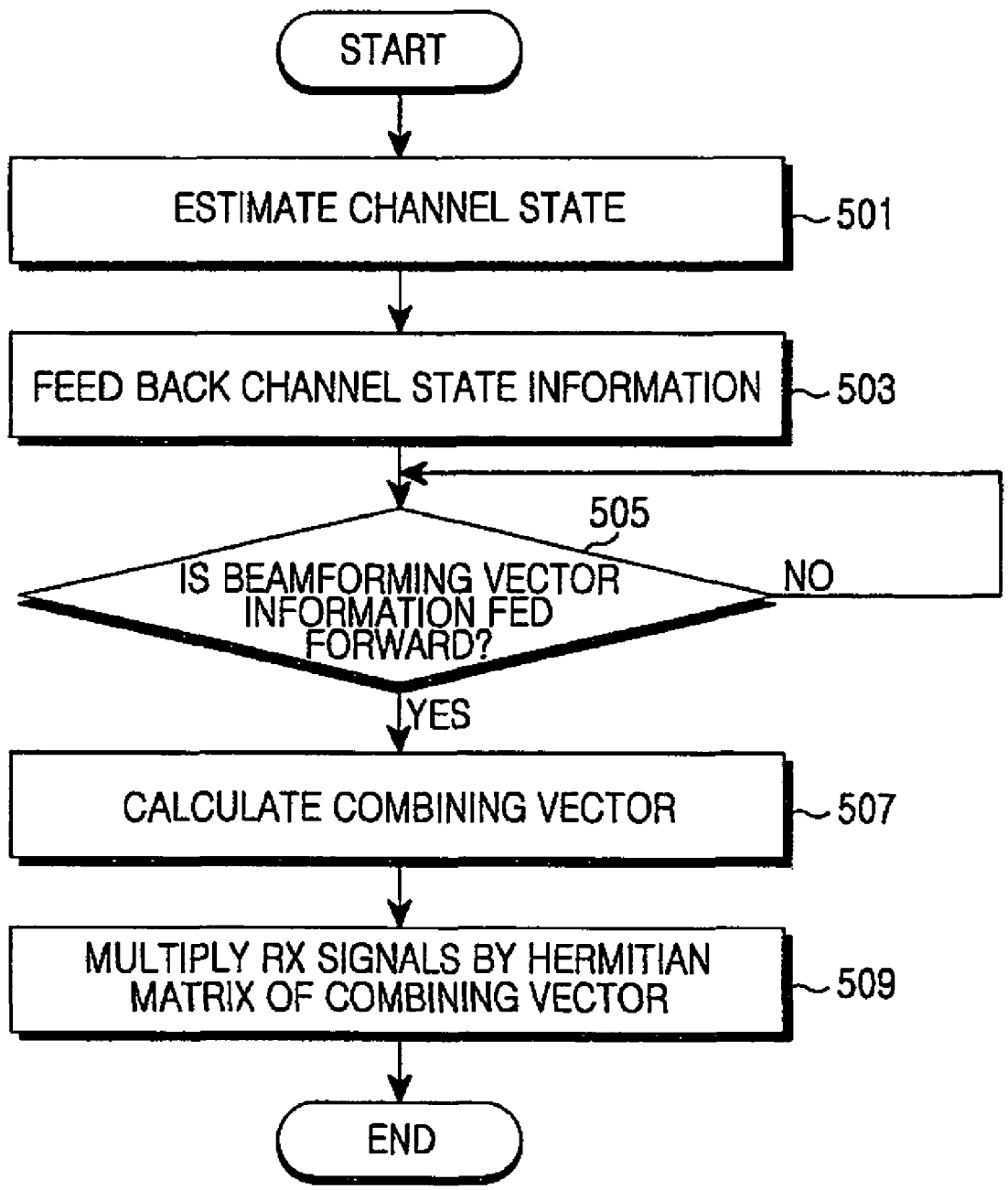
FIG. 5 is a flowchart illustrating a signal reception process of a user terminal in a MIMO wireless communication system according to an embodiment of the present invention.

FIG. 5 is a flowchart illustrating a signal reception process of a user terminal in a MIMO wireless communication system according to an embodiment of the present invention.

Referring to FIG. 5, the user terminal estimates a downlink channel state in step 501. Herein, the downlink channel state (i.e., the downlink channel matrix) is estimated using a known signal such as a pilot signal. The downlink channel matrix is a matrix with a size of {the number of TX antennas of a base station}×{the number of RX antennas of the user terminal}.

In step 503, the user terminal feeds back the channel state information to the base station.

In step 505, the user terminal determines whether beamforming vector information is fed forward. The information amount of the beamforming vector index (i.e., the number of bits) depends on the feedforward channel allocation results of the base station. Herein, the beamforming vector information is the value of elements of the beamforming vector or the index of the beamforming vectors contained in a codebook.

If the beamforming vector information is fed forward, the signal reception process proceeds to step 507. In step 507, the user terminal detects the beamforming vector and calculates a combining vector. For example, if a codebook is used, the user terminal detects a codebook corresponding to the number of bits constituting received index information, and detects a beamforming vector corresponding to the index in the detected codebook. Thereafter, the user terminal calculates the combining vector as expressed in Equation (5).

In step 509, the user terminal multiplies a Hermitian matrix of the combining vector by signals received through a plurality of antennas. Herein, the signals multiplied by the Hermitian matrix of the combining vector are converted into user data through demodulation and decoding.

In the embodiment described with reference to FIG. 5, the user terminal calculates the combining vector for downlink communication. However, the above-described embodiment of FIG. 5 can also be applied to calculate the beamforming vector of the user terminal for uplink communication. If the user terminal uses a TDD scheme, because an uplink channel and a downlink channel are identical, the user terminal uses the combining vector calculated according to the above-described embodiment as the beamforming vectors for uplink communication. On the other hand, if the user terminal uses an FDD scheme, it detects combining vector information fed back from the base station for uplink communication, and calculates its own beamforming vector for uplink communication by using the combining vector for uplink channel matrix.

As described above, the user terminal calculates the beamforming vectors for uplink communication, multiplies a TX signal by the beamforming vector for uplink communication, and transmits the beamformed TX signal through a plurality of TX antennas.

Figure 6:
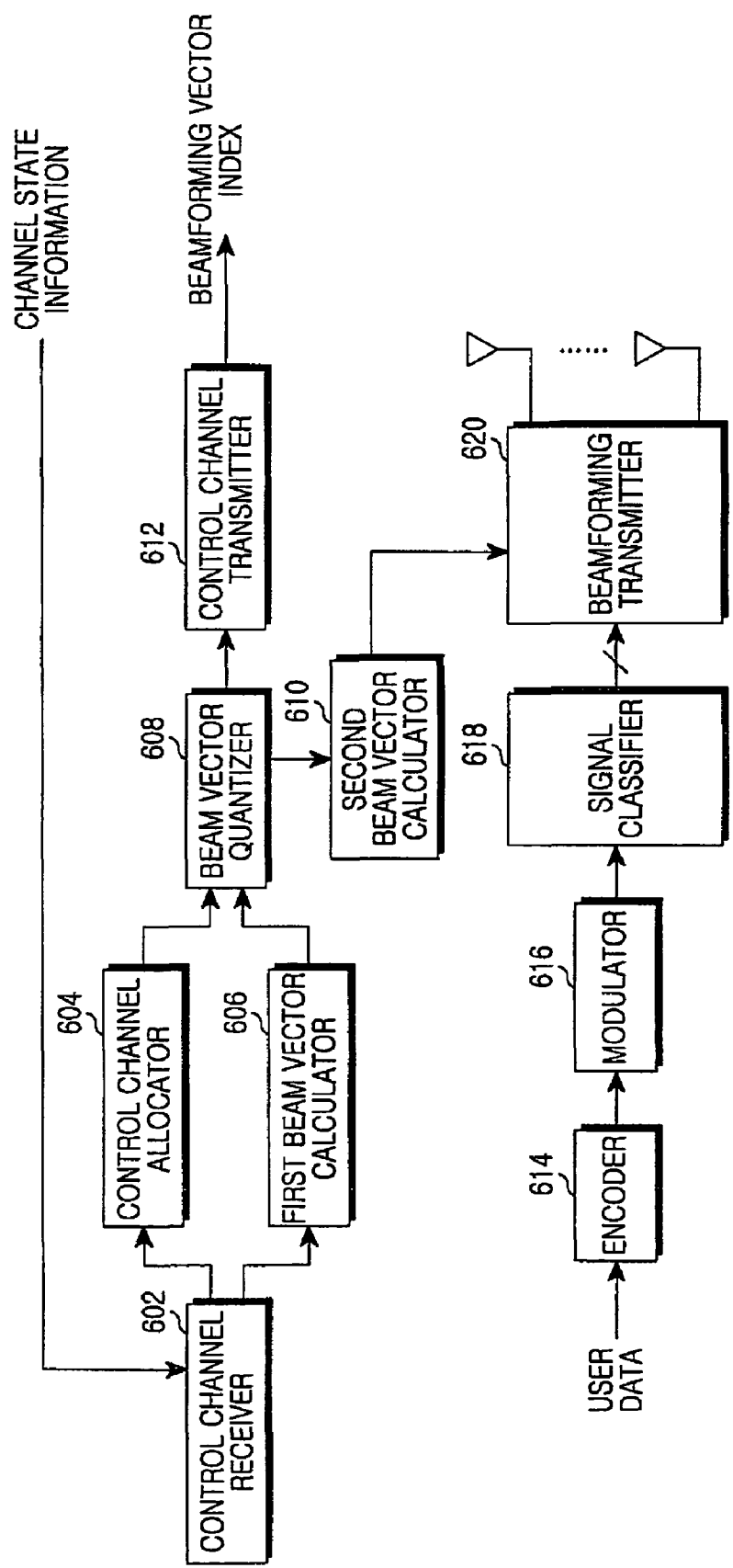
FIG. 6 is a block diagram of a base station in a MIMO wireless communication system according to an embodiment of the present invention.

FIG. 6 is a block diagram of a base station in a MIMO wireless communication system according to an embodiment of the present invention.

Referring to FIG. 6, the base station includes a control channel receiver 602, a control channel allocator 604, a first beam vector calculator 606, a beam vector quantizer 608, a second beam vector calculator 610, a control channel transmitter 612, an encoder 614, a modulator 616, a signal classifier 618, and a beamforming transmitter 620.

The control channel receiver 602 receives channel state information of user terminal from the user terminals over a control channel. The channel state information (i.e., channel matrix information) is a matrix with a size of {the number of TX antennas of the base station}×{the number of RX antennas of the user terminal}.

The control channel allocator 604 allocates resources in a limited-capacity control channel for feedforward of beamforming vector information. Herein, the resources in the control channel are allocated to the user terminals in such a way that a relatively small amount of resource is allocated to the user terminal with good channel quality. For example, when the user terminal 1 has poorer channel quality than the user terminal 2, the user terminal 1 is allocated a larger amount of resource than the user terminal 2. That is, in case of using codebooks, the control channel allocator 604 decides to use larger sized codebook for user terminal having poorer channel quality.

The first beam vector calculator 606 uses a downlink channel matrix of each user terminal to calculate a beamforming vector to be used for TX signal beamforming. That is, the first beam vector calculator 606 uses a downlink channel matrix of each of spatial multiple access user terminals to repeatedly calculate a beamforming vector of each of the user terminals, thereby calculating the optimal beamforming vector for each user terminal. Herein, a method for calculating the optimal beamforming vector varies depending on embodiments of the present invention.

According to an embodiment of the present invention, the first beam vector calculator 606 sets the principal left singular vector, which is obtained by performing singular value decomposition on the downlink channel matrix of each of the spatial multiple access user terminals, to an initial combining vector of each of the user terminals. Thereafter, the first beam vector calculator 606 repeatedly calculates the beamforming vector and the combining vector, which are obtained by performing singular value decomposition on an equivalent channel matrix calculated using the initial combining vectors, thereby calculating the optimal beamforming vector of each of the user terminals. For example, when a downlink beamforming vector of the $k^{th}$ user terminal is to be calculated in each repetition process, the first beam vector calculator 606 sequentially multiplies transpose matrixes of the products of a downlink channel matrix and a Hermitian matrix of a combining vector of each of the remaining user terminals except the $k^{th}$ user terminal among the spatial multiple access user terminals in ascending order of the user terminal indexes, and calculates a transpose matrix of the product of the transpose matrixes, thereby calculating an equivalent channel matrix of the $k^{th}$ user terminal. Thereafter, the first beam vector calculator 606 updates a right singular vector, which is obtained by performing singular value decomposition on the equivalent channel matrix of the $k^{th}$ user terminal, as a beamforming vector of the $k^{th}$ user terminal, and updates the product of the beamforming vector and the downlink channel matrix of the $k^{th}$ user terminal as a combining vector of the $k^{th}$ user terminal. Thereafter, the first beam vector calculator 606 determines whether the beamforming vector of the $k^{th}$ user terminal has been optimized. If the beamforming vector has not been optimized, the first beam vector calculator 606 repeats the above operation using the updated beamforming vector and the updated combining vector.

According to another embodiment of the present invention, the first beam vector calculator 606 sets the principal left singular vector, which is obtained by performing singular value decomposition on the channel matrix of each of the spatial multiple access user terminals, to an initial combining vector of each of the user terminals. Thereafter, the first beam vector calculator 606 repeatedly calculates the beamforming vector and the combining vector, which are obtained using an effective channel matrix calculated using the initial combining vectors, thereby calculating the optimal beamforming vector of each of the user terminals. For example, when a downlink beamforming vector of the $k^{th}$ user terminal is to be calculated in each repetition process, the first beam vector calculator 606 sequentially multiplies transpose matrixes of the products of a channel matrix and a Hermitian matrix of a combining vector of each of the spatial multiple access user terminals in ascending order of the user terminal indexes, and calculates a transpose matrix of the product of the transpose matrixes, thereby calculating the effective channel matrix. Thereafter, the first beam vector calculator 606 updates a vector, which is obtained by dividing the $k^{th}$ column of a pseudo inverse matrix of the effective channel matrix by the absolute value of the $k^{th}$ column of the pseudo inverse matrix of the effective channel matrix, as a beamforming vector of the $k^{th}$ user terminal, and updates the product of the beamforming vector and the downlink channel matrix of the $k^{th}$ user terminal as a combining vector of the $k^{th}$ user terminal. Thereafter, the first beam vector calculator 606 determines whether the beamforming vector of the $k^{th}$ user terminal has been optimized. If the beamforming vector has not been optimized, the first beam vector calculator 606 repeats the above operation using the updated beamforming vector and the updated combining vector.

According to still another embodiment of the present invention, the first beam vector calculator 606 sets the principal right singular vector, which is obtained by performing singular value decomposition on the channel matrix of each of the spatial multiple access user terminals, to an initial beamforming vector of each of the user terminals. Thereafter, the first beam vector calculator 606 repeatedly calculates the beamforming vector and the combining vector, which are obtained using an effective channel matrix calculated using the initial beamforming vectors, thereby calculating the optimal beamforming vector of each of the user terminals. For example, when a downlink beamforming vector of the $k^{th}$ user terminal is to be calculated in each repetition process, the first beam vector calculator 606 sequentially multiplies transpose matrixes of the products of a downlink channel matrix, a Hermitian matrix of the downlink channel matrix, and a Hermitian matrix of the beamforming vector of each of the spatial multiple access user terminals in ascending order of the user terminal indexes, and calculates a transpose matrix of the product of the transpose matrixes, thereby calculating the effective channel matrix. Thereafter, the first beam vector calculator 606 updates a vector, which is obtained by dividing the $k^{th}$ column of a pseudo inverse matrix of the effective channel matrix by the absolute value of the $k^{th}$ column of the pseudo inverse matrix of the effective channel matrix, as a beamforming vector of the $k^{th}$ user terminal. Thereafter, the first beam vector calculator 606 determines whether the beamforming vector of the $k^{th}$ user terminal has been optimized. If the beamforming vector has not been optimized, the first beam vector calculator 606 repeats the above operation using the updated beamforming vector.

The beam vector quantizer 608 receives the optimized beamforming vector from the first beam vector calculator 606, and quantizes the optimized beamforming vectors. Herein, a method of quantizing the optimized beamforming vector varies according to whether a codebook is used.

If a codebook is used, the beam vector quantizer 608 detects a codebook corresponding to the number of bits allocated to each user terminal, and selects a beamforming vector satisfying Equation (8) in the detected codebook. That is, the beam vector quantizer 608 selects a beamforming vector maximizing an SINR when the user terminal, which has received a signal obtained by multiplying the optimized beamforming vector, calculates a combining vector using the selected beamforming vector and multiplies the received signal by the calculated combining vector. On the other hand, if a codebook is not used, the beam vector quantizer 608 converts analog values of elements of the optimized beamforming vector calculated by the first beam vector calculator 606 into digital values. Herein, the number of quantization bits for the beamforming vector of each user terminal is determined by the control channel allocation of the control channel allocator 604. Thereafter, the beam vector quantizer 608 provides information of the quantized beamforming vectors to the second beam vector calculator 610.

The second beam vector calculator 610 calculates a beamforming vector considering the quantization error. For example, according to an embodiment of the present invention, the second beam vector calculator 610 calculates an equivalent channel matrix of each user terminal using a combining vector calculated using the quantized beamforming vector, and performs singular value decomposition on the equivalent channel matrixes to calculate the final beamforming vectors. According to another embodiment or still another embodiment of the present invention, the second beam vector calculator 610 calculates an effective channel matrix, and calculates the final beamforming vectors using the effective channel matrix.

The control channel transmitter 612 transmits the quantized beamforming vector index information to each user terminal over the control channel. The encoder 614 encodes user data into a channel-coded bit stream. The modulator 616 modulates the bit stream received from the encoder 614 into complex symbols. The signal classifier 618 classifies the complex symbols received from the modulator 616 by the user terminals. The beamforming transmitter 620 multiplies the user terminal signals from the signal classifier 618 by the corresponding beamforming vectors, and sums the TX signals of the respective user terminals. Thereafter, the beamforming transmitter 620 transmits the resulting TX signals through a plurality of TX antennas.

The beamforming vectors for downlink communication are calculated through the base station operation described with reference to the configuration illustrated in FIG. 6.

If the base station uses a TDD scheme, the beamforming vectors for downlink communication may be used as the combining vectors for uplink communication. In this case, the base station further includes a beam combining receiver (not illustrated). Herein, the beam combining receiver multiplies the downlink beamforming vectors respectively by signals received from the user terminals through a plurality of RX antennas, thereby dividing the signals of the respective user terminals.

On the other hand, if the base station uses an FDD scheme, the first beam vector calculator 606, the beam vector quantizer 608, the second beam vector calculator 610, and the control channel transmitter 612 are used to calculate the combining vector for uplink communication. Specifically, using information of the uplink channel matrixes of the spatial multiplex user terminals, the first beam vector calculator 606 calculates the beamforming vectors of the respective user terminals for uplink communication in the same manner as for calculating the beamforming vectors of the respective user terminals for downlink communication. The beam vector quantizer 608 quantizes the combining vectors of uplink communication. The second beam vector calculator 610 calculates the final combining vectors of the respective user terminals for uplink communication in consideration of the quantization error. In order to calculate the beamforming vectors of the user terminals for uplink communication, the control channel transmitter 612 feeds forward information of the quantized combining vectors for uplink communication to the user terminals. In addition, the base station further includes a beam combining receiver (not illustrated). Herein, the beam combining receiver multiplies the combining vectors for uplink communication respectively by signals received from the user terminals through a plurality of RX antennas, thereby dividing the signals of the respective user terminals.

Figure 7:
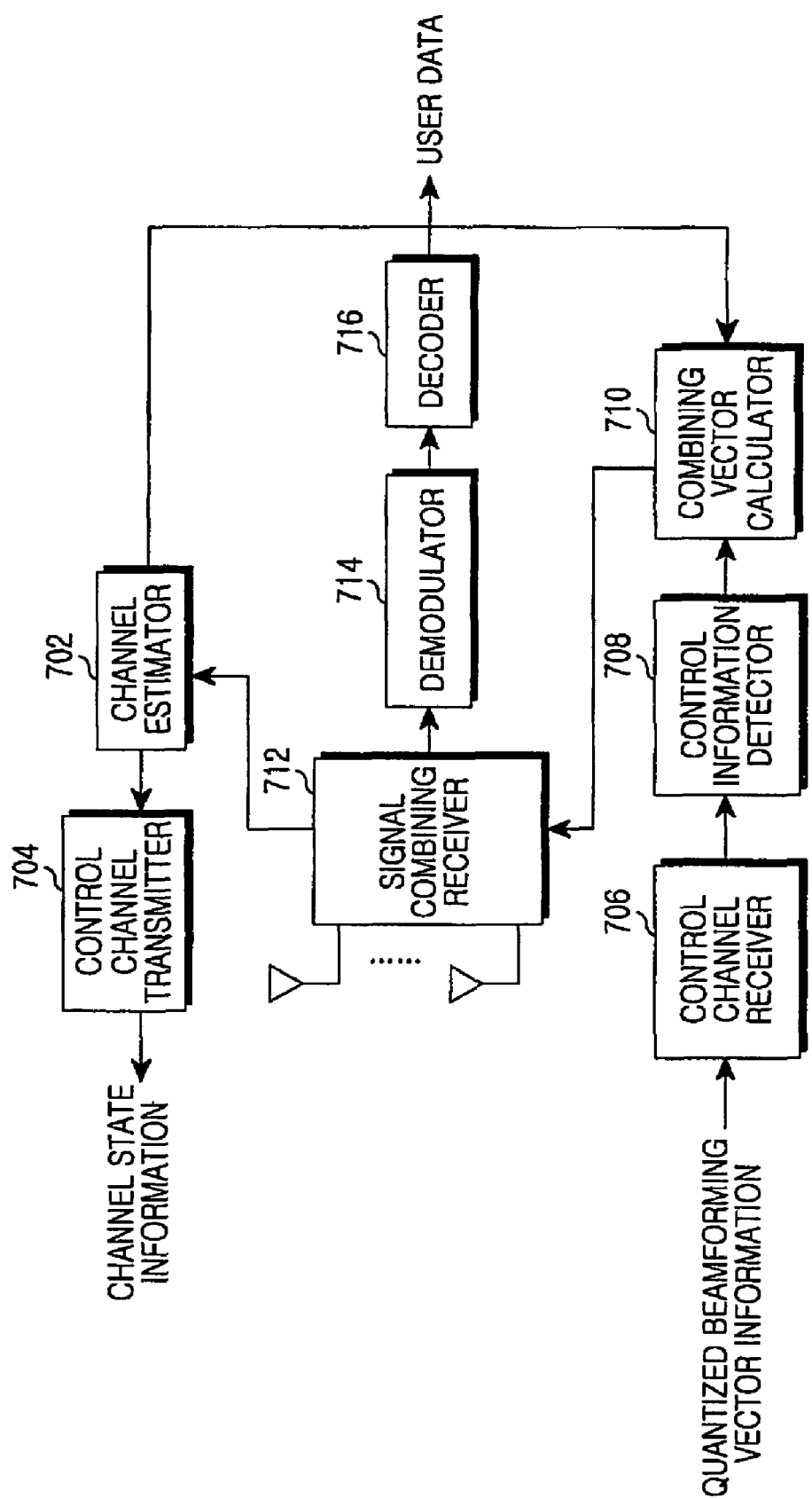
FIG. 7 is a block diagram of a user terminal in a MIMO wireless communication system according to an embodiment of the present invention.

FIG. 7 is a block diagram of a user terminal in a MIMO wireless communication system according to an embodiment of the present invention.

Referring to FIG. 7, the user terminal includes a channel estimator 702, a control channel transmitter 704, a control channel receiver 706, a control information detector 708, a combining vector calculator 710, a signal combining receiver 712, a demodulator 714, and a decoder 716.

The channel estimator 702 estimates a downlink channel state. Herein, the downlink channel state (i.e., the downlink channel matrix) is estimated using a known signal such as a pilot signal. The downlink channel matrix is a matrix with a size of {the number of TX antennas of a base station}×{the number of RX antennas of the user terminal}. The control channel transmitter 704 feeds back the channel state information received from the channel estimator 702 to the base station over a control channel.

The control channel receiver 706 receives beamforming vector index information from the base station over the control channel. Herein, the number of bits constituting the beamforming vector index information varies depending on the control channel allocation results of the base station. The control information detector 708 detects the beamforming vector information received over the control channel. For example, if a codebook is used, the control information detector 708 detects a codebook corresponding to the number of bits constituting the received index information, and detects a beamforming vector corresponding to the index in the detected codebook. As expressed in Equation (5), the combining vector calculator 710 multiplies its own downlink channel matrix by the beamforming vector detected by the control information detector 708, thereby calculating its own combining vector.

The signal combining receiver 712 multiplies a Hermitian matrix of the combining vector by signals received through a plurality of antennas, and outputs the resulting signals. The demodulator 714 demodulates the signals received from the signal combining receiver 712 into a bit stream. The decoder 716 decodes the bit stream received from the demodulator 714 into user data.

The combining vectors for downlink communication is calculated through the user terminal operation described with reference to the configuration illustrated in FIG. 7.

If the user terminal uses a TDD scheme, because an uplink channel and a downlink channel are identical, the combining vector may be used as the beamforming vectors for uplink communication. In this case, the user terminal further includes a beamforming transmitter (not illustrated). Herein, the beamforming transmitter performs a beamforming operation on a TX signal using a Hermitian matrix of the combining vector, and transmits the beamformed TX signal through a plurality of TX antennas.

On the other hand, if the user terminal uses an FDD scheme, the control information detector 708 and the combining vector calculator 710 are used to calculate the beamforming vector for uplink communication. Specifically, the control channel receiver 706 detects information of the quantized combining vector for uplink communication that is received from the base station through the control channel. The combining vector calculator 710 multiplies an uplink channel matrix between the base station and the user terminal by the combining vector for uplink communication, thereby calculating the beamforming vector for uplink communication. In addition, the user terminal further includes a beamforming transmitter (not illustrated). Herein, the beamforming transmitter performs a beamforming operation on a TX signal using a Hermitian matrix of the beamforming vector for uplink communication, and transmits the beamformed TX signal through a plurality of TX antennas.

Figure 8A:
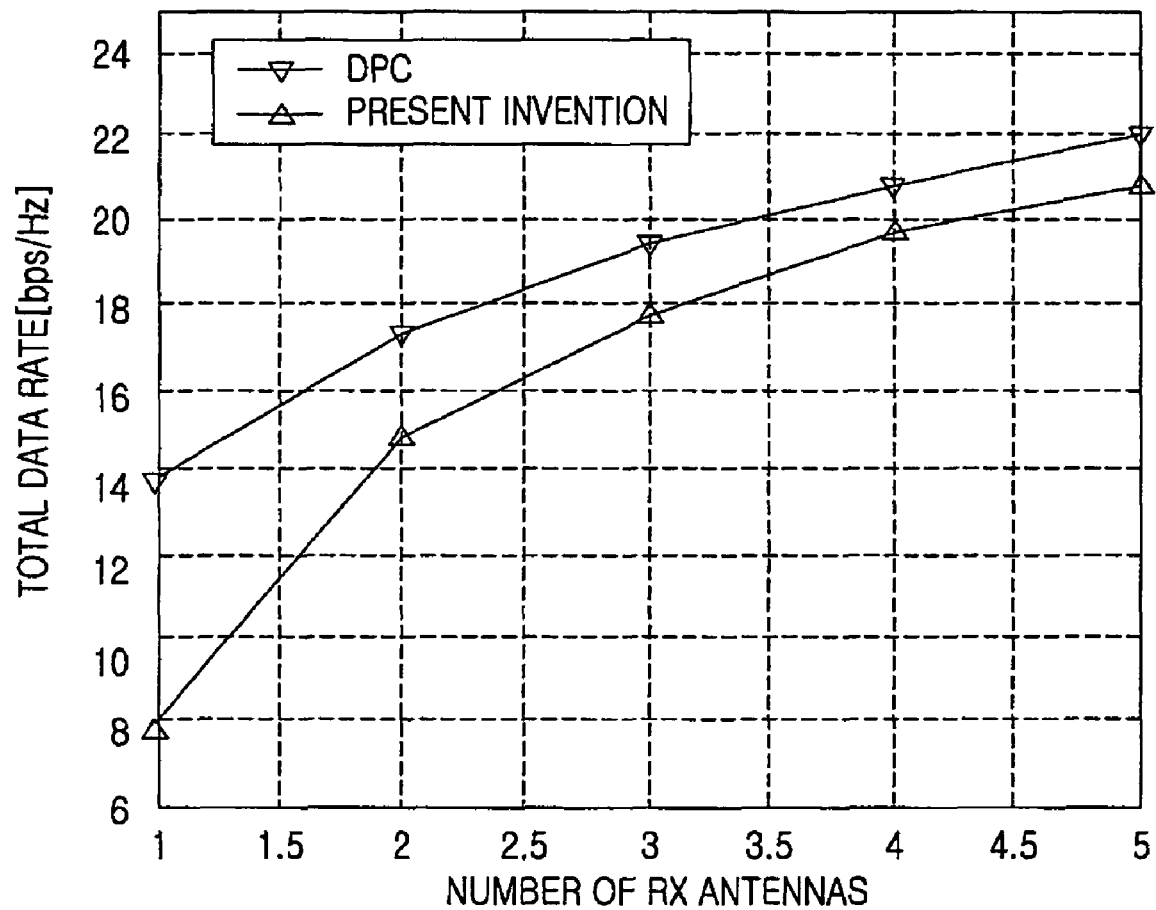
FIGS. 8A and 8B are graphs illustrating the performance of a beamforming scheme according to the present invention.
Figure 8B:
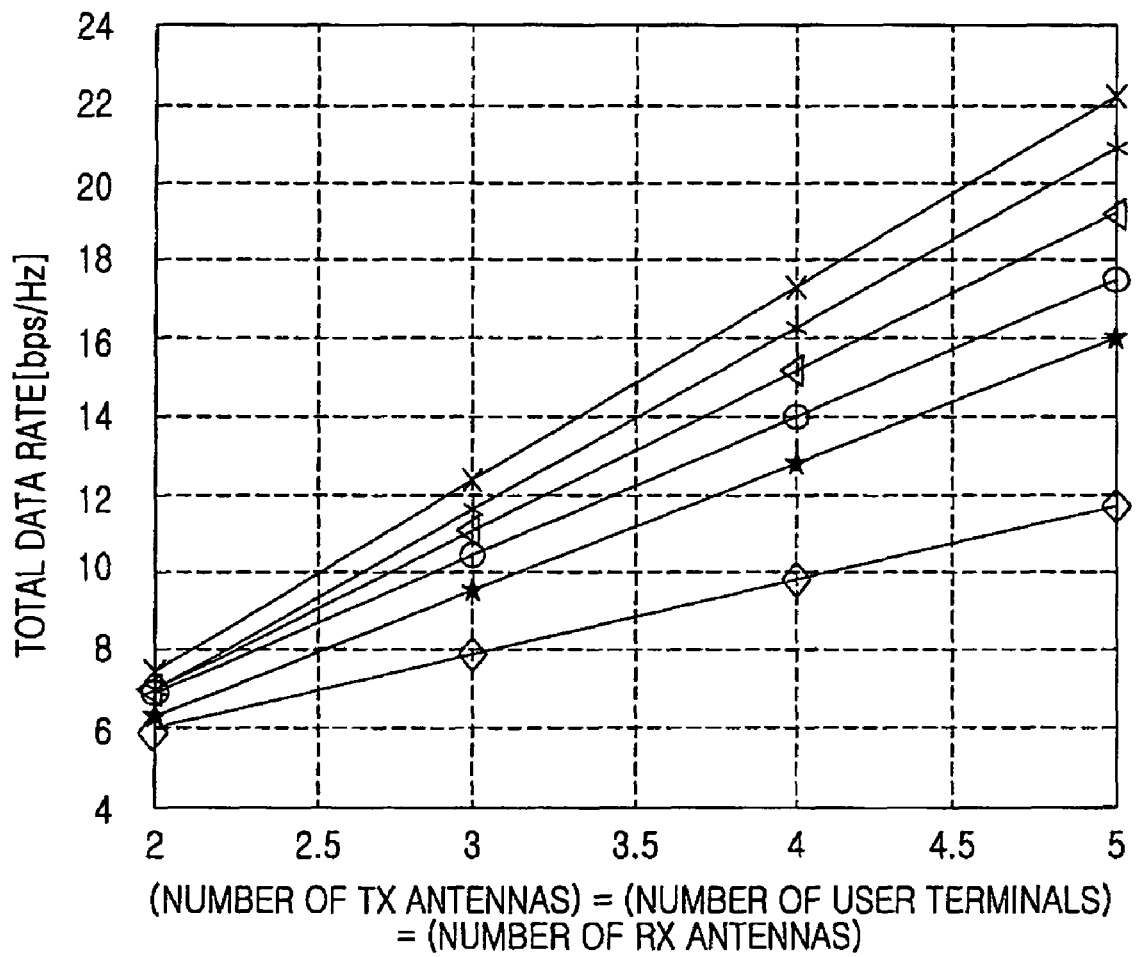

FIGS. 8A and 8B are graphs illustrating the simulation results showing the performance of a beamforming scheme according to the present invention.

FIG. 8A compares the most ideal DPC scheme with a beamforming scheme according to the present invention. FIG. 8A illustrates the total data rate depending on the number of RX antennas, in which the axis of abscissas represents the number of RX antenna and the axis of ordinates represents the total data rate. In FIG. 8A, it is assumed that the number of TX antennas is 5 and the number of RX antennas is 5. Referring to FIG. 8A, the DPC scheme provides a higher total data rate than the beamforming scheme of the present invention. In particular, the DPC scheme exhibits a great performance difference from the beamforming scheme of the present invention when the number of RX antennas is small. That is, as the number of RX antennas of a user terminal increases, the performance of the beamforming scheme of the present invention approaches the performance of the DPC scheme. Thus, when considering the very high complexity of the DPC scheme and the linear solution of the beamforming scheme of the present invention, it can be seen that the beamforming scheme of the present invention has a very good performance.

FIG. 8B compares the DPC scheme, the beamforming schemes of the present invention, a Single User Closed-Loop MIMO (SU CL MIMO) scheme, and an Independent Stream Scheduler scheme. In the case of unquantized, the beamforming schemes of the present invention are classified into the case of a 6-bit codebook and the case of a 3-bit codebook. FIG. 8B illustrates the total data rate depending on the number of TX antennas, the number of user terminals, and the number of RX antennas, in which the axis of abscissas represents the number of TX antennas, the number of user terminals, and the number of RX antennas and the axis of ordinates represents the total data rate. Herein, the number of TX antennas, the number of user terminals, and the number of RX antennas are identical to each other. Referring to FIG. 8B, when 5 TX antennas, 5 user terminals, and 5 RX antennas are used, the DPC scheme and the beamforming scheme of the present invention have a total data rate difference of about 1.6 bps/Hz. This difference decreases with a decrease in the value of abscissa, and the average of the difference is about 0.32 bps/Hz. Also, the performance of the beamforming scheme of the present invention decreases with a decrease in the number of bits of the codebook. However, the beamforming scheme of the present invention, which uses a 3-bit codebook and provides the lowest performance, provides a higher performance than the SU CL MIMO scheme and the Independent Stream Scheduler scheme.

In accordance with the present invention as described above, the MIMO wireless communication system quantizes the beamforming vector determined through the repetition process and notifies the quantization results to the user terminal over the limited feedforward channel, and the base station recalculates the beamforming vector in consideration of the quantization error. Therefore, it is possible to perform a beamforming operation that can provide a good performance, which is close to that of the ideal transmission scheme, with low complexity.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for a base station in a Multiple Input Multiple Output (MIMO) wireless communication system, the apparatus comprising:
a first calculator configured to repeatedly calculate, using information of downlink channel matrixes of spatial multiple access user terminals, downlink beamforming vectors of the user terminals to calculate the optimal beamforming vectors for the user terminals;
a quantizer configured to quantize the downlink beamforming vectors in order to transmit information of the downlink beamforming vectors;
a control channel transmitter configured to feed forward information of the quantized downlink beamforming vectors to the user terminals over a control channel;
a second calculator configured to calculate the final downlink beamforming vectors of the user terminals in consideration of an error due to the quantization; and
a beamforming transmitter configured to sum the beamformed TX signals of the user terminals in accordance with the final downlink beamforming vectors and transmit the summed TX signals through a plurality of TX antennas.

2. The apparatus of claim 1, wherein the first calculator is configured to:
set the principal left singular vectors, which are obtained by performing singular value decomposition on the downlink channel matrixes of the spatial multiple access user terminals, to the initial downlink combining vectors of the user terminals; and
repeatedly calculate the downlink beamforming vector and the downlink combining vector, which are obtained by performing singular value decomposition on an equivalent channel matrix calculated using the initial downlink combining vectors, to calculate the optimal downlink beamforming vectors of the user terminals.

3. The apparatus of claim 2, wherein when the downlink beamforming vector of the $k^{th}$ user terminal is to be calculated in each repetition process, the first calculator is configured to:
sequentially multiply all the transpose matrixes of the products of a downlink channel matrix and a Hermitian matrix of a combining vector of each of the remaining user terminals except the $k^{th}$ user terminal among the spatial multiple access user terminals in ascending order of user terminal indexes;
calculate a transpose matrix of the product of the transpose matrixes to calculate an equivalent channel matrix of the $k^{th}$ user terminal;
update a right singular vector, which is obtained by performing singular value decomposition on the equivalent channel matrix of the $k^{th}$ user terminal, as a downlink beamforming vector of the $k^h$ user terminal;
update the product of the downlink beamforming vector and the downlink channel matrix of the $k^{th}$ user terminal as a downlink combining vector of the $k^{th}$ user terminal; and
determine whether the downlink beamforming vector of the $k^{th}$ user terminal has been optimized; and
the second calculator is configured to calculate the final downlink combining vectors of the user terminals using the quantized downlink beamforming vectors; calculate equivalent channel matrixes of the user terminals using the downlink combining vectors; and perform singular value decomposition on the equivalent channel matrixes of the user terminals to calculate the final downlink beamforming vectors of the user terminals.

4. The apparatus of claim 1, wherein the first calculator is configured to:
set the principal left singular vectors, which are obtained by performing singular value decomposition on the channel matrixes of the spatial multiple access user terminals, to the initial downlink combining vectors of the user terminals; and
repeatedly calculate the downlink beamforming vector and the downlink combining vector, which are obtained using an effective channel matrix calculated using the initial downlink combining vectors, to calculate the optimal downlink beamforming vectors of the user terminals.

5. The apparatus of claim 4, wherein the first calculator is configured to:
sequentially multiply all the transpose matrixes of the products of a downlink channel matrix and a Hermitian matrix of a downlink combining vector of each of the spatial multiple access user terminals in ascending order of user terminal indexes;
calculate a transpose matrix of the product of the transpose matrixes to calculate the effective channel matrix;
when the downlink beamforming vector of the $k^{th}$ user terminal is to be calculated, update a vector, which is obtained by dividing the $k^{th}$ column of a pseudo inverse matrix of the effective channel matrix by the absolute value of the $k^{th}$ column of the pseudo inverse matrix of the effective channel matrix, as a downlink beamforming vector of the $k^{th}$ user terminal, and update the product of the downlink beamforming vector and the downlink channel matrix of the $k^{th}$ user terminal as a downlink combining vector of the $k^{th}$ user terminal; and
determine whether the downlink beamforming vector of the $k^{th}$ user terminal has been optimized; and
the second calculator is configured to:
calculate the final downlink combining vectors of the user terminals using the quantized downlink beamforming vectors;
calculate the effective channel matrix using the downlink combining vectors; and
calculate the final downlink beamforming vectors of the user terminals using the effective channel matrix.

6. The apparatus of claim 1, wherein the first calculator is configured to:
set the principal right singular vectors, which are obtained by performing singular value decomposition on the channel matrixes of the spatial multiple access user terminals, to the initial downlink beamforming vectors of the user terminals; and
repeatedly calculate the downlink beamforming vector, which is obtained using an effective channel matrix calculated using the initial downlink beamforming vectors, to calculate the optimal downlink beamforming vectors of the user terminals.

7. The apparatus of claim 6, wherein the first calculator is configured to:
sequentially multiply all the transpose matrixes of the products of a downlink channel matrix, a Hermitian matrix of the downlink channel matrix, and a Hermitian matrix of the downlink beamforming vector of each of the spatial multiple access user terminals in ascending order of user terminal indexes;
calculate a transpose matrix of the product of the transpose matrixes to calculate the effective channel matrix;
when the downlink beamforming vector of the $k^{th}$ user terminal is to be calculated, update a vector, which is obtained by dividing the $k^{th}$ column of a pseudo inverse matrix of the effective channel matrix by the absolute value of the $k^{th}$ column of the pseudo inverse matrix of the effective channel matrix, as a downlink beamforming vector of the $k^{th}$ user terminal; and determine whether the downlink beamforming vector of the $k^{th}$ user terminal has been optimized.

8. The apparatus of claim 1, further comprising an allocator configured to allocate resources in the control channel to the user terminals in such a way that a relatively small amount of resource is allocated to the user terminal with good channel quality.

9. The apparatus of claim 8, wherein when the downlink beamforming vector of the $k^{th}$ user terminal is to be quantized, the quantizer is configured to:

detect a codebook corresponding to the control channel resource amount allocated to the $k^{th}$ user terminal, and select beamforming vectors maximizing the RX signal strength of the $k^{th}$ user terminal in the detected codebook to quantize the downlink beamforming vector of the $k^{th}$ user terminal.

10. The apparatus of claim 1, further comprising a beam combining receiver configured to multiply the downlink beamforming vectors respectively by signals received from the user terminals through a plurality of RX antennas to divide the signals of the user terminals.

11. The apparatus of claim 1, wherein the first calculator is configured to calculate the uplink combining vectors of the user terminals in the same manner as for calculating the downlink beamforming vectors of the user terminals using information of the uplink channel matrixes of the spatial multiple access user terminals;

the quantizer is configured to quantize the uplink combining vectors;

the control channel transmitter is configured to feed forward the quantized uplink combining vectors to the user terminals; and the second calculator is configured to calculate the final uplink combining vectors of the user terminals in consideration of an error due to the quantization.

12. The apparatus of claim 11, further comprising a beam combining receiver configured to multiply the downlink combining vectors respectively by signals received from the user terminals through a plurality of RX antennas to divide the signals of the user terminals.

13. A method for operating a base station in a Multiple Input Multiple Output (MIMO) wireless communication system, the method comprising:

repeatedly calculating, using information of downlink channel matrixes of spatial multiple access user terminals, downlink beamforming vectors of the user terminals to calculate the optimal beamforming vectors for the user terminals;

quantizing the downlink beamforming vectors in order to transmit information of the downlink beamforming vectors;

feeding forward information of the quantized downlink beamforming vectors to the user terminals over a control channel;

calculating the final downlink beamforming vectors of the user terminals in consideration of an error due to the quantization; and summing the beamformed TX signals of the user terminals in accordance with the final downlink beamforming vectors and transmitting the summed TX signals through a plurality of TX antennas.

14. The method of claim 13, wherein the calculating of the downlink beamforming vectors of the user terminal comprises:

setting the principal left singular vectors, which are obtained by performing singular value decomposition on the downlink channel matrixes of the spatial multiple access user terminals, to the initial downlink combining vectors of the user terminals; and repeatedly calculating the downlink beamforming vector and the downlink combining vector, which are obtained by performing singular value decomposition on an equivalent channel matrix calculated using the initial downlink combining vectors, to calculate the optimal downlink beamforming vectors of the user terminals.

15. The method of claim 14, wherein the repeated calculating of the downlink beamforming vector and the downlink combining vector comprises:

when the downlink beamforming vector of the $k^{th}$ user terminal is to be calculated in each repetition process, sequentially multiplying transpose matrixes of the products of a downlink channel matrix and a Hermitian matrix of a combining vector of each of the remaining user terminals except the $k^{th}$ user terminal among the spatial multiple access user terminals in ascending order of user terminal indexes, and calculating a transpose matrix of the product of the transpose matrixes to calculate an equivalent channel matrix of the $k^{th}$ user terminal;

updating a right singular vector, which is obtained by performing singular value decomposition on the equivalent channel matrix of the $k^{th}$ user terminal, as a downlink beamforming vector of the $k^{th}$ user terminal;

updating the product of the downlink beamforming vector and the downlink channel matrix of the $k^{th}$ user terminal as a downlink combining vector of the $k^{th}$ user terminal; and determining whether the downlink beamforming vector of the $k^{th}$ user terminal has been optimized.

16. The method of claim 15, wherein the calculating of the final downlink beamforming vectors comprises:

calculating the final downlink combining vectors of the user terminals using the quantized downlink beamforming vectors; and calculating equivalent channel matrixes of the user terminals using the downlink combining vectors, and performing singular value decomposition on the equivalent channel matrixes of the user terminals to calculate the final downlink beamforming vectors of the user terminals.

17. The method of claim 13, wherein the calculating of the optimal downlink beamforming vectors of the user terminals comprises:

setting the principal left singular vectors, which are obtained by performing singular value decomposition on the channel matrixes of the spatial multiple access user terminals, to the initial downlink combining vectors of the user terminals; and repeatedly calculating the downlink beamforming vector and the downlink combining vector, which are obtained using an effective channel matrix calculated using the initial downlink beamforming vectors, to calculate the optimal downlink beamforming vectors of the user terminals.

18. The method of claim 17, wherein the repeated calculating of the downlink beamforming vector and the downlink combining vector comprises:

sequentially multiplying all the transpose matrixes of the products of a downlink channel matrix and a Hermitian matrix of a downlink combining vector of each of the spatial multiple access user terminals in ascending order of user terminal indexes, and calculating a transpose matrix of the product of the transpose matrixes to calculate the effective channel matrix;

when the downlink beamforming vector of the $k^{th}$ user terminal is to be calculated, updating a vector, which is obtained by dividing the $k^{th}$ column of a pseudo inverse matrix of the effective channel matrix by the absolute value of the $k^{th}$ column of the pseudo inverse matrix of the effective channel matrix, as a downlink beamforming vector of the $k^{th}$ user terminal;

updating the product of the downlink beamforming vector and the downlink channel matrix of the $k^{th}$ user terminal as a downlink combining vector of the $k^{th}$ user terminal; and determining whether the downlink beamforming vector of the $k^{th}$ user terminal has been optimized.

19. The method of claim 18, wherein the calculating of the final downlink beamforming vectors comprises:

calculating the final downlink combining vectors of the user terminals using the quantized downlink beamforming vectors; and calculating the effective channel matrix using the downlink combining vectors, and calculating the final downlink beamforming vectors of the user terminals using the effective channel matrix.

20. The method of claim 13, wherein the calculating of the optimal downlink beamforming vectors of the user terminals comprises:

setting the principal right singular vectors, which are obtained by performing singular value decomposition on the channel matrixes of the spatial multiple access user terminals, to the initial downlink beamforming vectors of the user terminals; and repeatedly calculating the downlink beamforming vector, which is obtained using an effective channel matrix calculated using the initial downlink beamforming vectors, to calculate the optimal downlink beamforming vectors of the user terminals.

21. The method of claim 20, wherein the repeated calculating of the downlink beamforming vector comprises:

sequentially multiplying all the transpose matrixes of the products of a downlink channel matrix, a Hermitian matrix of the downlink channel matrix, and a Hermitian matrix of the downlink beamforming vector of each of the spatial multiple access user terminals in ascending order of user terminal indexes, and calculating a transpose matrix of the product of the transpose matrixes to calculate the effective channel matrix;

when the downlink beamforming vector of the $k^{th}$ user terminal is to be calculated, updating a vector, which is obtained by dividing the $k^{th}$ column of a pseudo inverse matrix of the effective channel matrix by the absolute value of the $k^{th}$ column of the pseudo inverse matrix of the effective channel matrix, as a downlink beamforming vector of the $k^{th}$ user terminal; and determines whether the downlink beamforming vector of the $k^{th}$ user terminal has been optimized.

22. The method of claim 13, further comprising allocating resources in the control channel to the user terminals in such a way that a relatively small amount of resource is allocated to the user terminal with good channel quality.

23. The method of claim 22, wherein the quantizing of the downlink beamforming vectors comprises:

when the downlink beamforming vector of the $k^{th}$ user terminal is to be quantized, detecting a codebook corresponding to the control channel resource amount allocated to the $k^{th}$ user terminal; and selecting beamforming vectors maximizing the RX signal strength of the $k^{th}$ user terminal in the detected codebook to quantize the downlink beamforming vector of the $k^{th}$ user terminal.

24. The method of claim 13, further comprising multiplying the downlink beamforming vectors respectively by signals received from the user terminals through a plurality of RX antennas to divide the signals of the user terminals.

25. The method of claim 13, further comprising:

calculating the uplink combining vectors of the user terminals in the same manner as for calculating the downlink beamforming vectors of the user terminals using information of the uplink channel matrixes of the spatial multiple access user terminals;

quantizing the uplink combining vectors;

feeding forward the quantized uplink combining vectors to the user terminals; and calculating the final uplink combining vectors of the user terminals in consideration of an error due to the quantization.

26. The method of claim 25, further comprising multiplying the downlink combining vectors respectively by signals received from the user terminals through a plurality of RX antennas to divide the signals of the user terminals.

* * * * *